United States Patent
Chao et al.

(10) Patent No.: US 8,111,916 B2
(45) Date of Patent: Feb. 7, 2012

(54) DEVICE OF GATHERING STATISTICS OF GRAY DISTRIBUTION OF IMAGE AND METHOD THEREOF

(75) Inventors: Yue-Li Chao, Taoyuan County (TW); Chun-Lun Pan, Tainan (TW); Hui-Chen Lin, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 607 days.

(21) Appl. No.: 12/267,612

(22) Filed: Nov. 9, 2008

(65) Prior Publication Data

US 2010/0046836 A1 Feb. 25, 2010

(30) Foreign Application Priority Data

Aug. 25, 2008 (TW) .............................. 97132436 A (51) Int. Cl.
*G06K 9/00* (2006.01)
(52) U.S. Cl. .................. 382/169; 382/100; 382/168
(58) Field of Classification Search .................. 382/100, 382/190, 199, 169, 241, 195, 266, 286, 168; 358/301; 347/248; 340/630; 356/438; 702/84
See application file for complete search history.

(56) References Cited

U.S. PATENT DOCUMENTS

| | | | |
|---|---|---|---|
| 6,075,890 A | 6/2000 | Park | |
| 6,219,447 B1 | 4/2001 | Lee | |
| 6,259,472 B1 | 7/2001 | Park | |
| 7,302,111 B2 * | 11/2007 | Olsson et al. | 382/266 |
| 7,646,919 B2 * | 1/2010 | Olsson et al. | 382/199 |
| 7,715,641 B2 * | 5/2010 | Olsson et al. | 382/241 |
| 2006/0115150 A1 | 6/2006 | Gay-Bellile et al. | |

OTHER PUBLICATIONS

"Office Action of Taiwan Counterpart Application", issued on Nov. 30, 2011, p. 1-p. 6, in which the listed references were cited.

* cited by examiner

*Primary Examiner* — Anh Hong Do
(74) *Attorney, Agent, or Firm* — Jianq Chyun IP Office (57) ABSTRACT

A device of gathering statistics of the gray distribution of an image and a method thereof are provided. The device includes a comparing unit, a count unit, a memory unit, and a data allotment unit. The comparing unit determines gray information of a plurality of gray data of the input image, and output a respective count signal accordingly. The count unit includes a plurality of counters. Each counter corresponding to predetermined gray information has a count value. The counters update the count values according to the respective count signals. When the count value exceeds a predetermined value, the count unit outputs a pulse signal corresponding to the predetermined gray information. The data allotment unit updates the statistics of the gray distribution of the image stored in the memory unit according to the pulse signal. The present invention reduces the number of the registers the counters require and decreases hardware costs.

8 Claims, 9 Drawing Sheets

DEVICE OF GATHERING STATISTICS OF GRAY DISTRIBUTION OF IMAGE AND METHOD THEREOF

CROSS-REFERENCE TO RELATED APPLICATION

This application claims the priority benefit of Taiwan application serial no. 97132436, filed on Aug. 25, 2008. The entirety of the above-mentioned patent application is hereby incorporated by reference herein and made a part of specification.

BACKGROUND OF THE INVENTION

1. Field of the Invention

The present invention relates to a technology of analyzing digital images and more particularly, to a device of gathering statistics of gray distribution of images and a method thereof.

2. Description of Related Art

A gray histogram (abbreviated as GH) and a gray cumulative percentage graph are important and indispensable information in image processing. In general, the gray histogram is obtained with a probability distribution function (PDF) and the gray cumulative percentage graph is obtained with a cumulative distribution function (CDF). Further illustration on the gray histogram and the gray cumulative percentage graph is provided below.

Figure 1A:
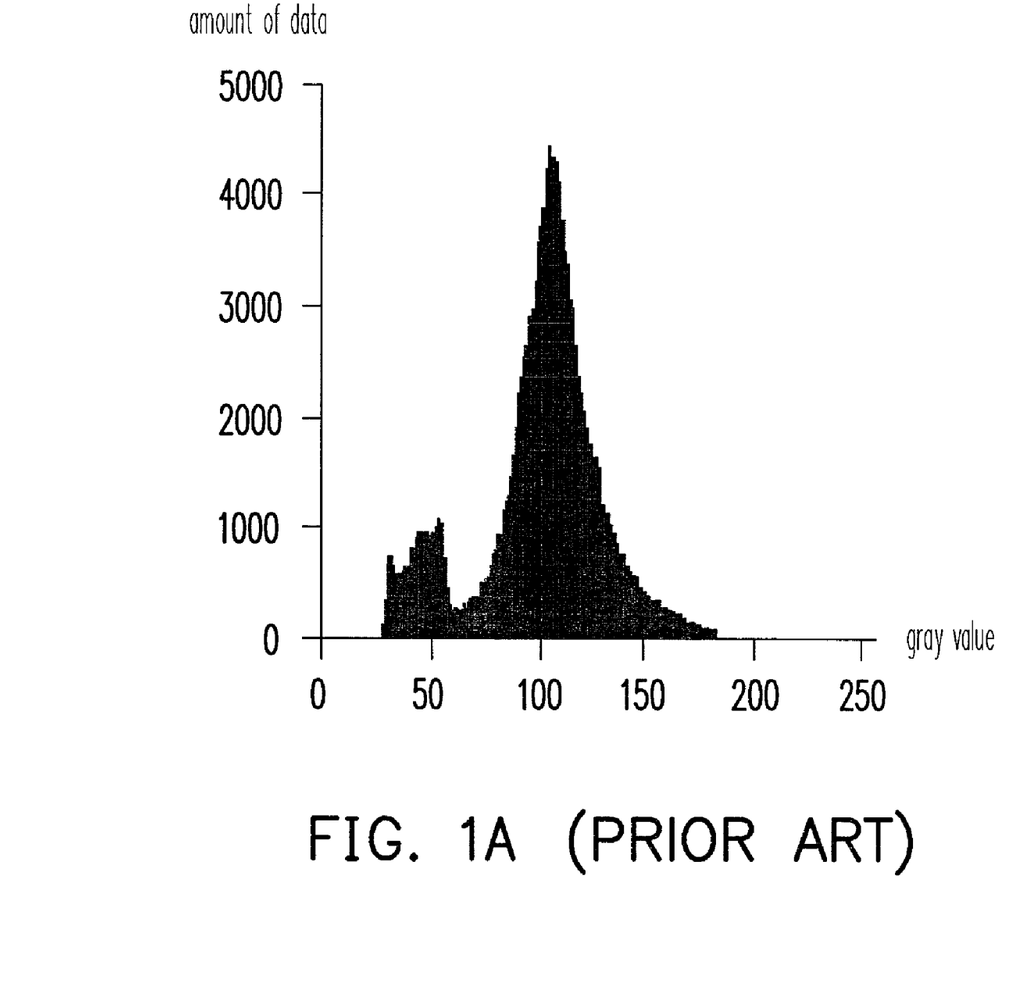
FIG. 1A is a conventional gray histogram.

FIG. 1A is a conventional gray histogram. Referring to FIG. 1A, the gray histogram may be used to determine gray distribution of images, wherein the horizontal axis represents gray values and the vertical axis represents amount of data, i.e. the distribution of the amount of data of each gray value. Take a normally black liquid crystal display as an example. The closer the peak is to the right of the histogram, the more bright data there are and the brighter the entire image will appear. In contrast, the closer the peak is to the left of the histogram, the more dark data there are and the darker the entire image will appear.

Figure 1B:
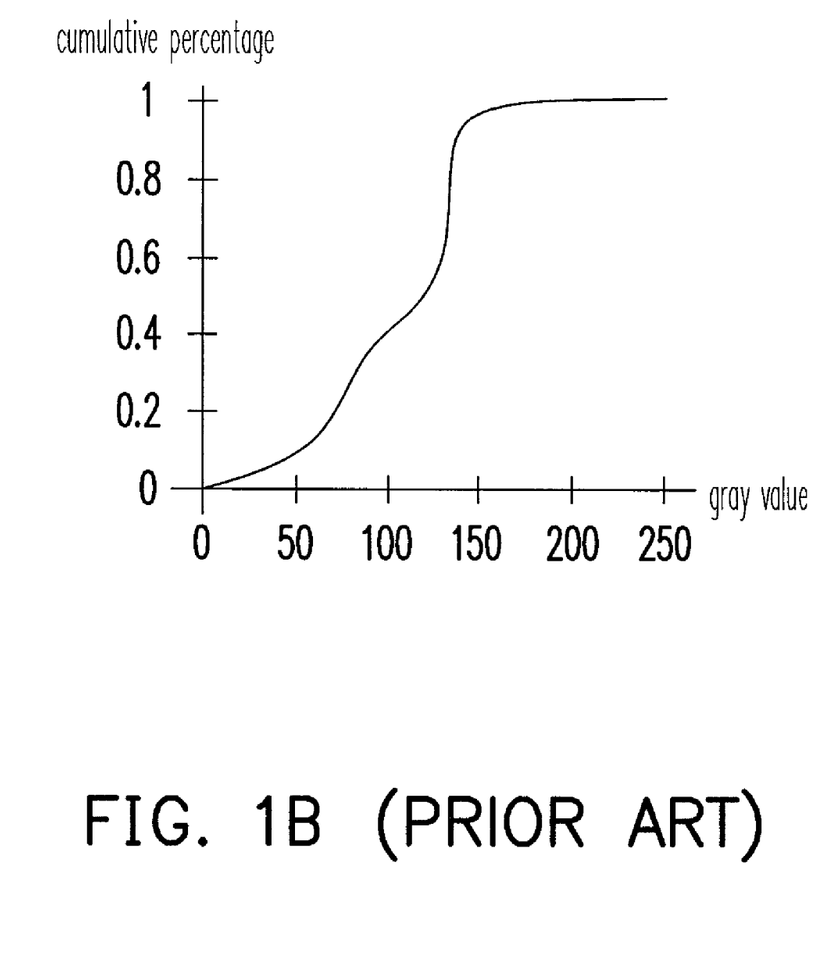
FIG. 1B is a conventional gray cumulative percentage graph.

FIG. 1B is a conventional gray cumulative percentage graph. Referring to FIG. 1B, the gray cumulative percentage graph may also be used as a tool to determine gray distribution of images. The gray cumulative percentage graph of FIG. 1B is similar to the gray histogram of FIG. 1A. The difference lies in that the horizontal axis of the gray cumulative percentage graph represents gray values and the vertical axis represents cumulative percentages, i.e. the cumulative percentage of each gray value of an image. For example, the gray value 200 illustrates a cumulative percentage which is obtained by dividing the total number of pixels in an image having a gray value under 200 by the total number of pixels in the image.

Figure 2A:
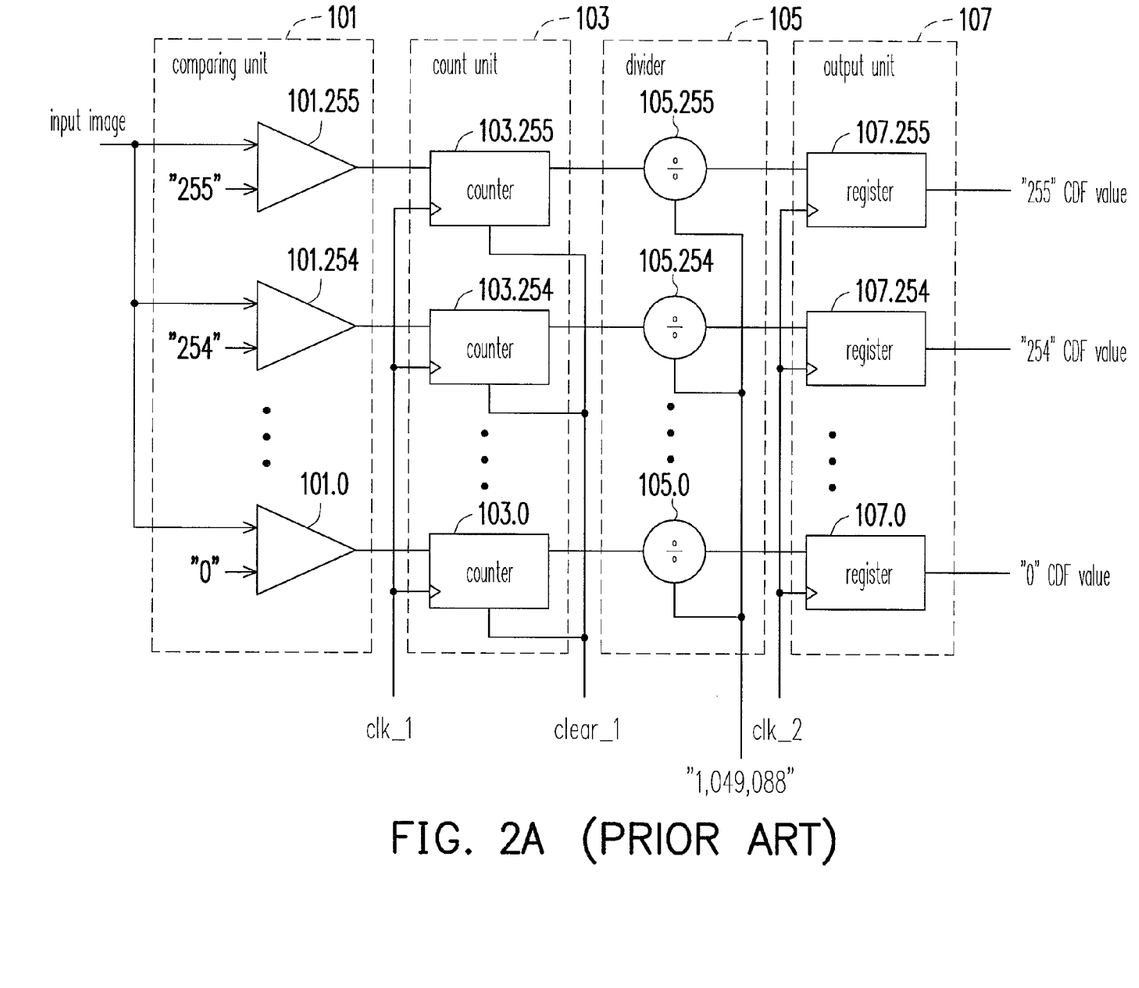
FIG. 2A is a conventional circuit structure diagram of calculating CDF values.

FIG. 2A is a conventional circuit structure diagram of calculating CDF values. Referring to FIG. 2A, take a monochrome image of having 256 gray levels and a resolution of 1366×768 as an example. A comparing unit 101 has 256 comparators, i.e. 101.0~101.255. A count unit 103 has 256 counters, i.e. 103.0~103.255. A division unit 105 has 256 dividers, i.e. 105.0~105.255. An output unit 107 has 256 registers. i.e. 107.0~107.255.

First input terminals of the comparators 101.0~101.255 respectively receive predetermined gray information "0" to "255." Second input terminals of the comparators 101.0~101.255 are used to receive gray values of the various data in the image. In light of the above, when the gray values received by the second input terminals of the comparators are lower than or equal to the predetermined gray information of the first input terminals, the said comparators output a high level voltage. Otherwise, the comparators output a low level voltage.

More specifically, when the gray values received at the second input terminals of the comparators 101.0~101.255 are "50," the comparators 101.0~101.50 all output a high level voltage and the comparators 101.51~101.255 will all output a low level voltage.

The counters 103.0~103.255 respectively store a count value and may clear the count values based on a clearing signal clear_1. When each of the counters receives a high level voltage "1," the said counter will add 1 to the count value stored therein according to a clock signal clk_1. The purpose is to keep a count of the amount of data of various gray values in the input image. Furthermore, the counters 103.0~103.255 may respectively output the abovementioned amount of data to the dividers 105.0~105.255. Next, the dividers 105.0~105.255 respectively divide the received amount of data by the total amount of data "1,049,088" in the image. As such, a cumulative percentage of each gray value in the input image may be obtained. Finally, the registers 107.0~107.255 latch the output values from the dividers 105.0~105.255 and respectively output the CDF values of the gray values "0"~"255" according to a clock signal clk_2.

It should be mentioned that the maximum limit of the possible amount of data of each gray value is 1366×768=1,049,088. Therefore, each of the counters in the count unit 103 has to be a counter of 21 bits or more. That is, each counter requires at least 21 registers to implement. In other words, the count unit 103 requires 256×21=5,376 registers. Furthermore, if gray cumulative percentage graphs of two input images are to be retained, the count unit 103 has to use 10,752 registers. In addition, the number of registers required by the count unit 103 rises with the increase in the resolution or the number of gray levels of the input image. In other words, the conventional circuit for calculating CDF values applied in an image of high resolution or high number of gray levels often requires tremendous hardware costs and thus is not suitable for practical use in products.

Figure 2B:
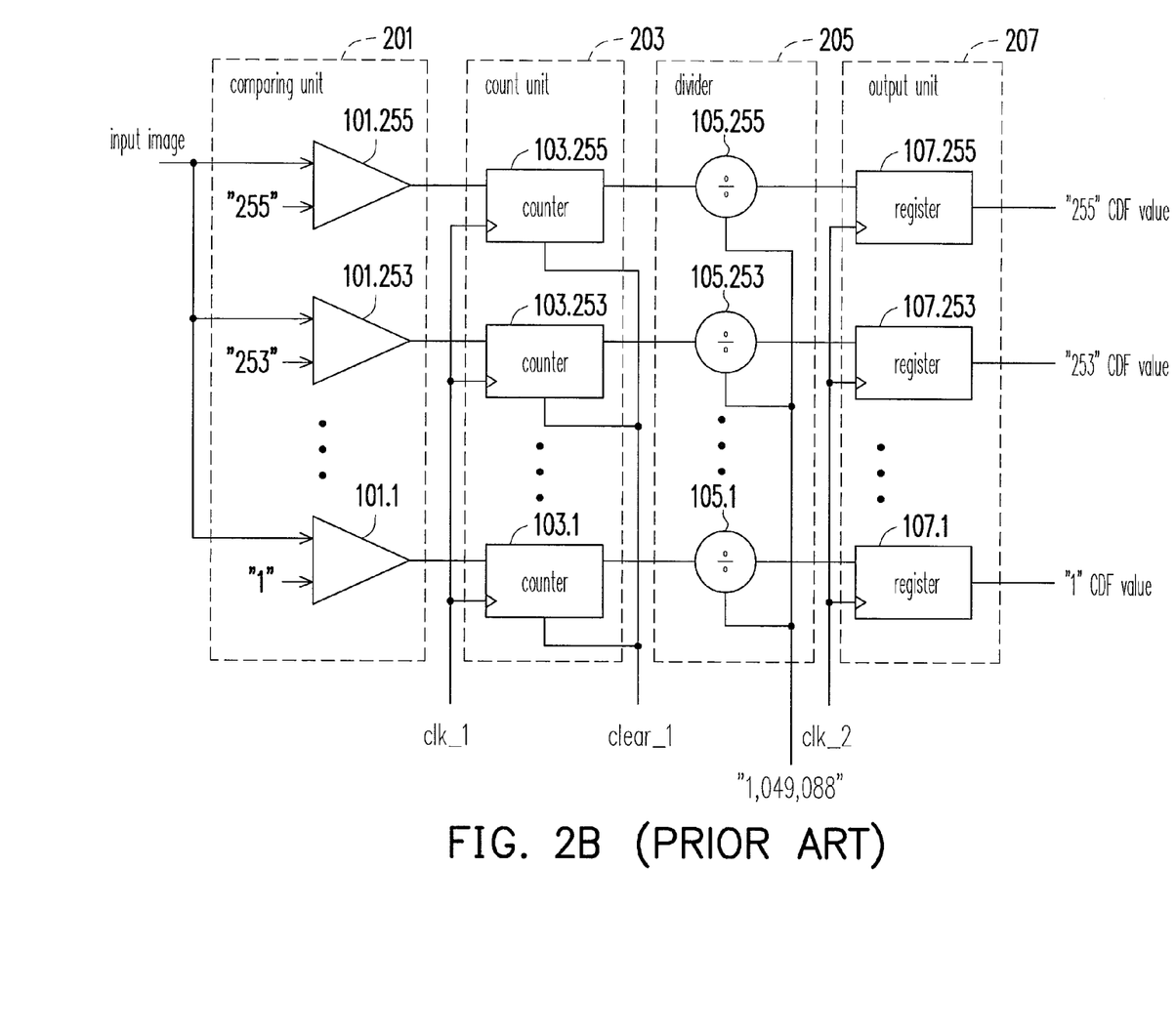
FIG. 2B is another conventional circuit structure diagram of calculating CDF values.

In light of the above, a conventional solution has been developed which gathers statistics on a combination of gray values. FIG. 2B is another conventional circuit structure diagram of calculating CDF values. Take a monochrome image having 256 gray levels and a resolution of 1366×768 as an example again. FIG. 2B is similar to FIG. 2A with a difference in that a comparing unit 201 has 128 comparators, i.e. 101.1, 101.3, ... ,101.253, and 101.255. A count unit 203 has 128 counters, i.e. 103.1, 103.3, ... ,103.253, and 103.255. A division unit 205 has 128 dividers, i.e. 105.1, 105.3, ... , 105.253, and 105.255. An output unit 207 has 128 registers, i.e. 107.1, 107.3, ... ,107.253, and 107.255.

An amount of data of gray value under "1" in an image may be obtained through the comparator 101.1, the counter 103.1, the divider 105.1, and the register 107.1. Similarly, an amount of data of gray value under "3" in an image may be obtained through the comparator 101.3, the counter 103.3, the divider 105.3, and the register 107.3. Simply speaking, the approach is to incorporate the calculation of the data of gray value "0" and "1," the calculation of the data of gray value "2" and "3," ... , and the calculation of the data of gray value "254" and "255." As such, the number of counters used by the count unit 203 decreases to 128 and the number of registers decreases to 2688. However, the approach may only obtain the total amount of data of two gray values and not the amount data of each individual gray value.

SUMMARY OF THE INVENTION

The present invention provides a device of gathering statistics of gray distribution of an image. When a count value corresponding to each piece of gray information exceeds a predetermined value, the gray distribution of the image is updated to reduce the number of registers used by the count unit and thus decrease hardware costs.

The present invention provides a method of gathering statistics of gray distribution of an image. The count value of each piece of gray information is accumulated and when the accumulated value exceeds a predetermined value, the gray distribution of the image is updated to simplify the flow of process of the method of gathering statistics of gray distribution of an image.

The present invention provides a device of gathering statistics of gray distribution of an image. The device of gathering statistics of gray distribution of an image includes a comparing unit, a count unit, a memory unit, and a data allotment unit. The comparing unit is used to determine gray information of a plurality of data of an image, based on which, the comparing unit outputs a corresponding count signal. The count unit is coupled to the comparing unit. The count unit has a plurality of counters and each of the counters corresponds to predetermined gray information and has a count value. Each of the counters updates the count value according to the corresponding count signal. When the count value exceeds a predetermined value, the count unit outputs a pulse signal of the gray information corresponding to the count value. The memory unit is used to store the gray distribution of an image. The data allotment unit is coupled to the count unit and the memory unit and updates the gray distribution of an image in the memory unit according to the received pulse signal.

In one embodiment of the present invention, the comparing unit has a plurality of comparators. Each comparator respectively receives the predetermined gray information corresponding to each counter. Each comparator is used to respectively compare the data of the input image with the predetermined gray information to determine the gray information of each data of the input image.

In one embodiment of the present invention, the count unit further includes a plurality of pulse generators. Each pulse generator is respectively coupled to each counter. When one of the plurality of count values exceeds the predetermined value, the corresponding counter outputs an overflow signal to the pulse generator to cause the pulse generator to output a pulse signal.

In one embodiment of the present invention, the pulse generator respectively includes a first D flip-flop, a second D flip-flop, a NOT gate, an AND gate, and a third D flip-flop. The first D flip-flop is coupled to the counter, receives the overflow signal, and outputs the overflow signal according to a first clock signal. An input terminal of the second D flip-flop is coupled to an output terminal of the first D flip-flop. The second D flip-flop may output the overflow signal according to the signal output from the first D flip-flop. An input terminal of the NOT gate is coupled to the output terminal of the first D flip-flop. A first input terminal and a second input terminal of the AND gate are respectively coupled to an output terminal of the second D flip-flop and an output terminal of the NOT gate to generate the pulse signal. The third D flip-flop is coupled to an output terminal of the AND gate and outputs the pulse signal according to a second clock signal.

In one embodiment of the present invention, the data allotment unit includes a distributor, a delayer, a control unit, and a feedback circuit. The distributor is coupled to the count unit and provides fixed address information and a read signal according to the pulse signal. The delayer is coupled to the distributor, and used to delay the read signal so as to generate a write signal. The control unit is coupled to the distributor and the delayer and causes the memory unit to output the gray statistics of the gray distribution of the image according to the fixed address information and the read signal. The feedback circuit is coupled to the memory unit and the control unit, and used to update the gray statistics and to send back the updated gray statistics to the control unit. The control unit then writes the updated gray statistics into the memory unit according to the write signal. In another embodiment, the feedback circuit includes an adder. The adder is coupled to the memory unit and the control unit, and used to add a fixed value to the gray statistics output from the memory unit and send the added value back to the control unit.

In one embodiment of the present invention, the memory unit includes a plurality of sub memory units. Each sub memory unit is used to retain a gray distribution of an input image. In another embodiment, each counter and each memory unit respectively has a receiving terminal for a clearing signal. When each counter receives a clearing signal, the counter resets the count value. When the memory unit receives the clearing signal, the memory unit resets the gray distribution of the image.

From another perspective, the present invention provides a method of gathering statistics of gray distribution of an image. The method includes determining gray information of a plurality of data of an input image, wherein each piece of information corresponds to a count value. In addition, a fixed value is sequentially added to the corresponding count value according to the gray information of the data. When the count value exceeds a predetermined value, the count value is reset and the gray distribution of the image is updated.

In one embodiment of the present invention, the method of gathering statistics of gray distribution of an image further includes resetting each count value and gray distribution of an image. In another embodiment, after the step of updating the gray distribution of the image, the method further includes a period, in which the gray distribution of the input image and a next image of the input image are displayed together.

The present invention may reduce the number of registers and thus decrease the hardware costs of the device of gathering statistics of gray distribution of an image by adopting the approach of updating the gray distribution of an image after the count value accumulating each piece of gray information exceeds a predetermined value.

In order to make the aforementioned and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The First Embodiment

Figure 3:
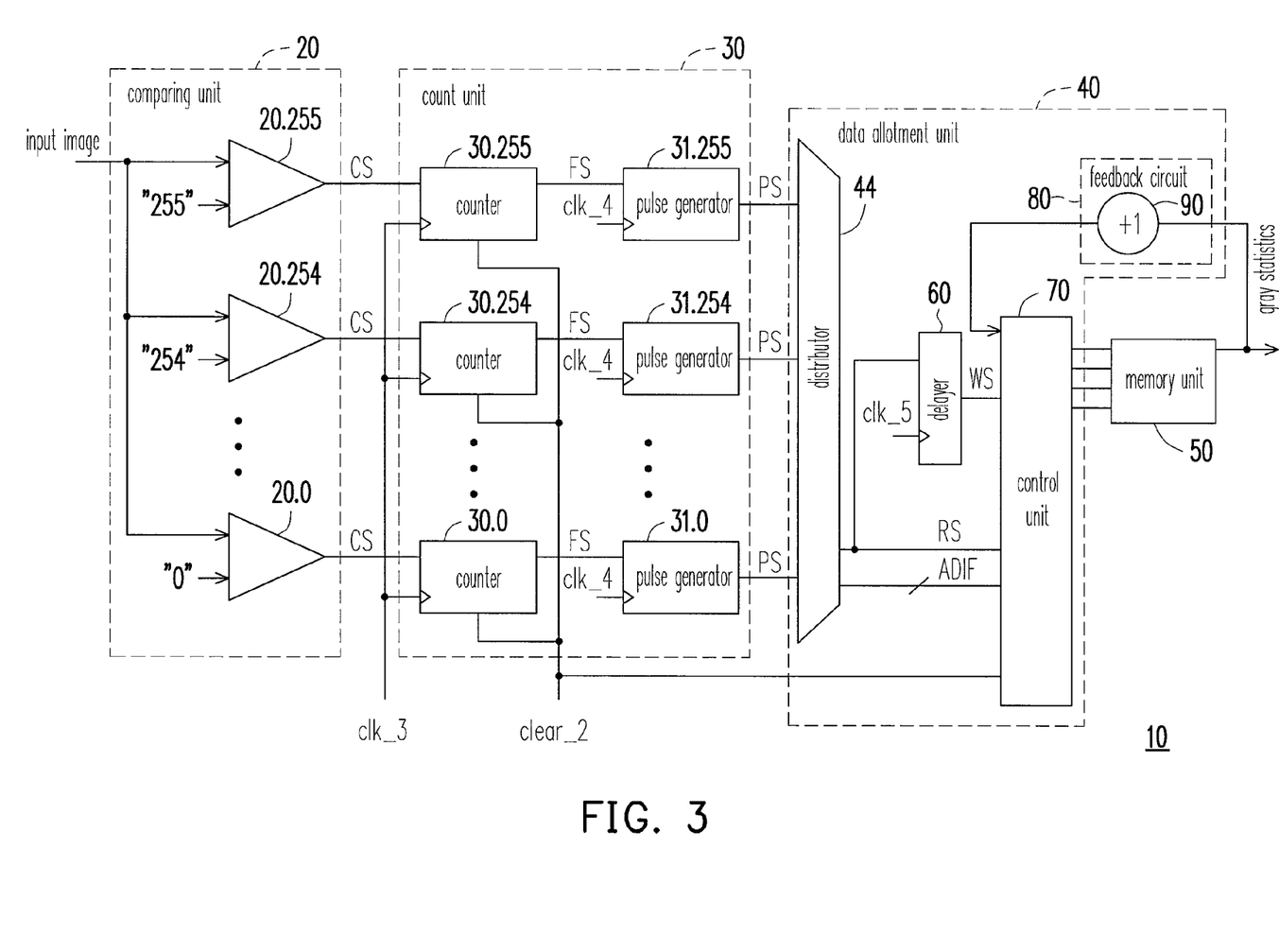
FIG. 3 is a schematic diagram of a device of gathering statistics of gray distribution of an image according to a first embodiment of the present invention.

FIG. 3 is a schematic diagram of a device of gathering statistics of gray distribution of an image according to the first embodiment of the present invention. Referring to FIG. 3, a device 10 of gathering statistics of gray distribution of an image includes a comparing unit 20, a count unit 30, a memory unit 50, and a data allotment unit 40. Take a monochrome image having 256 gray levels and a resolution of 1366×768 as an example. The comparing unit 20 is used to determine gray information of each of a plurality of data in an image, based on which, the comparing unit 20 outputs a corresponding count signal CS. More specifically, the comparing unit 20 has a plurality of comparators (shown as 20.0~20.255). The comparators 20.0~20.255 respectively receive predetermined gray information "0"~"255" and each of the input image data. The comparators 20.0~20.255 are used to respectively compare the gray value of each input image data with the predetermined gray information "0"~"255" so as to determine the gray information of each input image data. For example, when the gray value of the image data is "30," only the comparator 20.30 will output a high level voltage count signal CS. The comparators 20.0~20.29 and 20.31~20.255 will output low level voltage count signals CS.

The count unit 30 is coupled to the comparing unit 20. The count unit 30 has a plurality of counters (shown as 30.0~30.255) and a plurality of pulse generators (shown as 31.0~31.255). The counters 30.0~30.255 respectively correspond to predetermined gray information "0"~"255" and respectively store a count value. The counters 30.0~30.255 respectively update the count values according to the count signals CS output from the comparators 20.0~20.255. When the count value exceeds the predetermined value, each counter outputs an overflow signal FS of the corresponding gray information according to a clock signal clk_3. The counters 30.0~30.255 in the present embodiment use counters of 2 bits as an example for the purpose of illustration. The counters 30.0~30.255 respectively comprise two registers and can count from 0 to 3. However, the present invention does not limit the number of bits of the counters. The counters 30.0~30.255 are implemented with counters of other number of bits in other embodiments.

From the above, the pulse generators 31.0~31.255 are respectively coupled to the counters 30.0~30.255. The pulse generators 31.0~31.255 generate corresponding pulse signals PS according to the overflow signals FS output from the counters 30.0~30.255 and a clock signal clk_4. The pulse signals PS generated by the pulse generators 31.0~31.255 respectively correspond to the predetermined gray information "0"~"255."

On the other hand, the data allotment unit 40 is coupled to the count unit 30 and the memory unit 50. The data allotment unit 40 may update the gray distribution of the image in the memory unit 50 according to the pulse signals PS generated in the pulse generators 31.0~31.255. For example, the data allotment unit 40 includes a distributor 44, a delayer 60, a control unit 70, and a feedback circuit 80. The distributor 44 is coupled to the pulse generators 31.0~31.255 and the delayer 60. The control unit 70 is coupled to the distributor 44, the delayer 60, and the feedback circuit 80. The feedback circuit 80 is coupled to the memory unit 50.

The distributor 44 may provide fixed address information ADIF and a read signal RS according to the received pulse signal PS. The delayer 60 is used to delay the read signal RS and generate a write signal WS according a clock signal clk_5. The control unit 70 makes the memory unit 50 output a gray statistics of the gray distribution of the image corresponding to the fixed address information ADIF to the feedback circuit 80 according to the fixed address information ADIF and the read signal RS.

The feedback circuit 80 is used to update the gray statistics. The feedback circuit 80 includes an adder 90, for example. The adder 90 adds a fixed value to the gray statistics output from the memory unit 50, and sends the added result back to the control unit 70. The control unit 70 then sequentially writes the updated gray statistics into the memory unit 50 according to the write signal WS. In the present embodiment, the abovementioned fixed value is 1, for example. An implementation of a pulse generator is illustrated below for reference by persons skilled in the art.

Figure 4A:
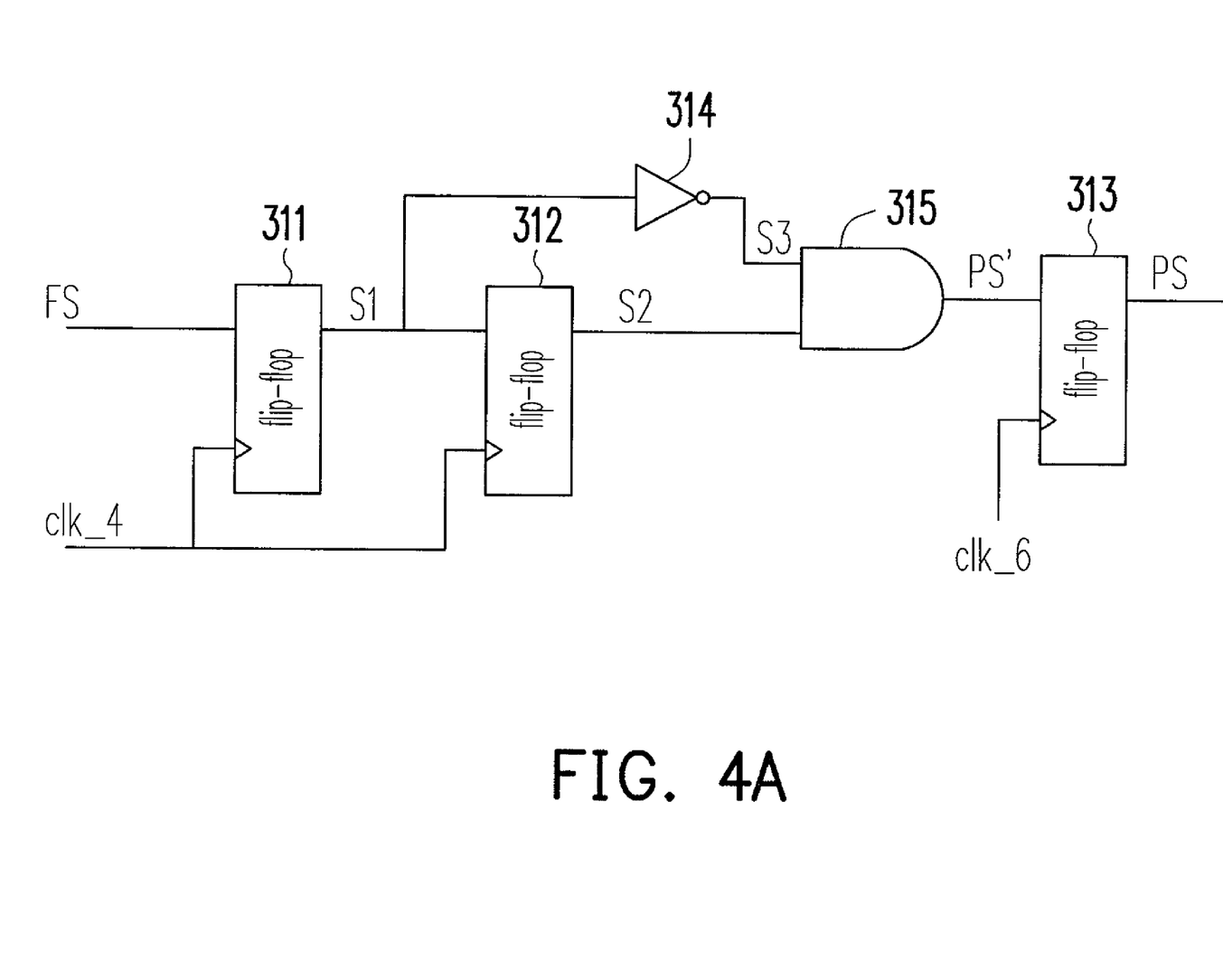
FIG. 4A is a circuit diagram of a pulse generator according to the first embodiment of the present invention.
Figure 4B:
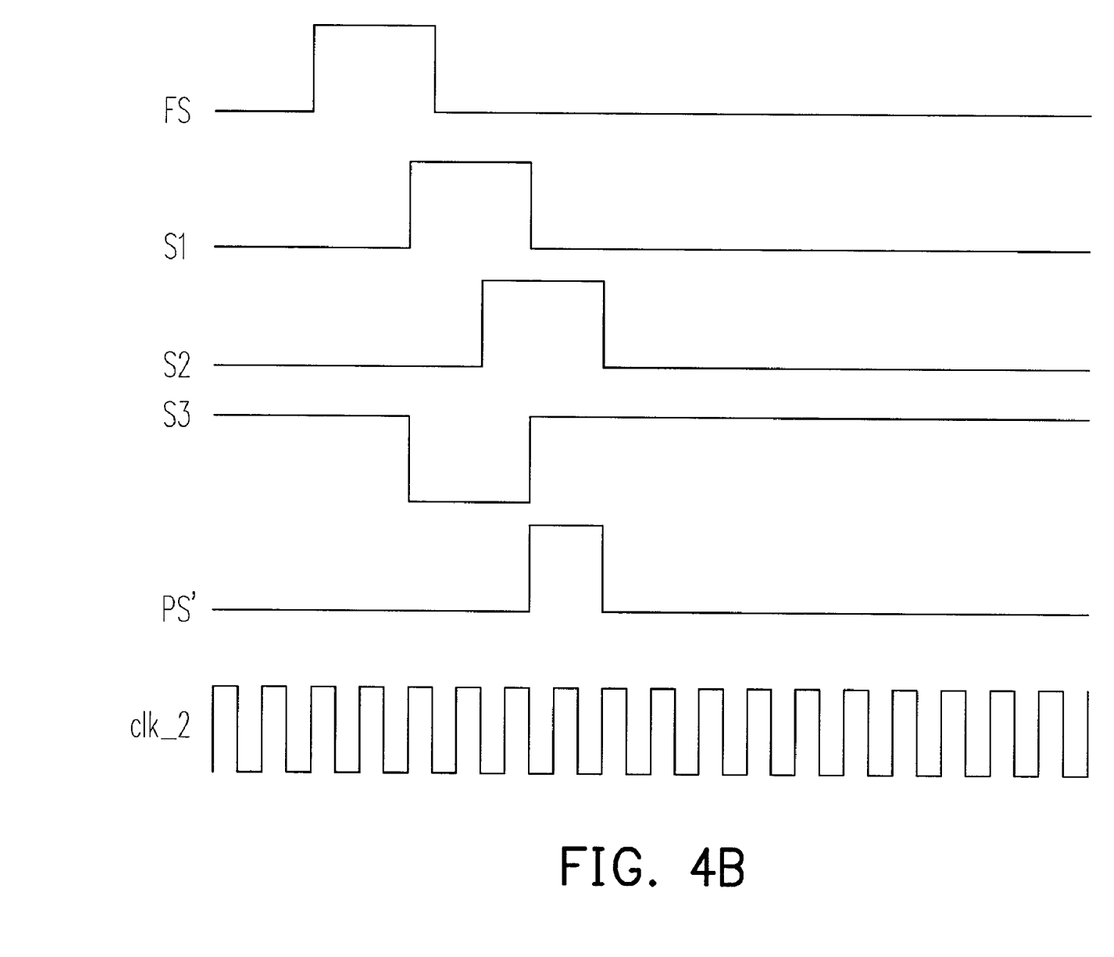
FIG. 4B is a timing diagram of internal signals in a pulse generator according to the first embodiment of the present invention.

FIG. 4A is a circuit diagram of the pulse generator according to the first embodiment of the present invention. FIG. 4B is a timing diagram of internal signals in a pulse generator according to the first embodiment of the present invention. Referring to both FIG. 4A and FIG. 4B, in the present embodiment, the pulse generators 31.0~31.255 may respectively include D flip-flops 311~313, a NOT gate 314, and an AND gate 315, for example. The D flip-flop 311 is used to receive the overflow signal FS and output an overflow signal S1 according to the clock signal clk_4. The NOT gate 314 is used to convert the state of the overflow signal S1 to generate an overflow signal S3 for the AND gate 315. The D flip-flop 312 receives the overflow signal S1 and outputs an overflow signal S2 for the AND gate 315 according to the clock signal clk_4. The AND gate 315 respectively receives the overflow signals S2 and S3 to generate a pulse signal PS' for the D flip-flop 313. The D flip-flop 313 may output the pulse signal PS according to a clock signal clk_6.

Figure 5:
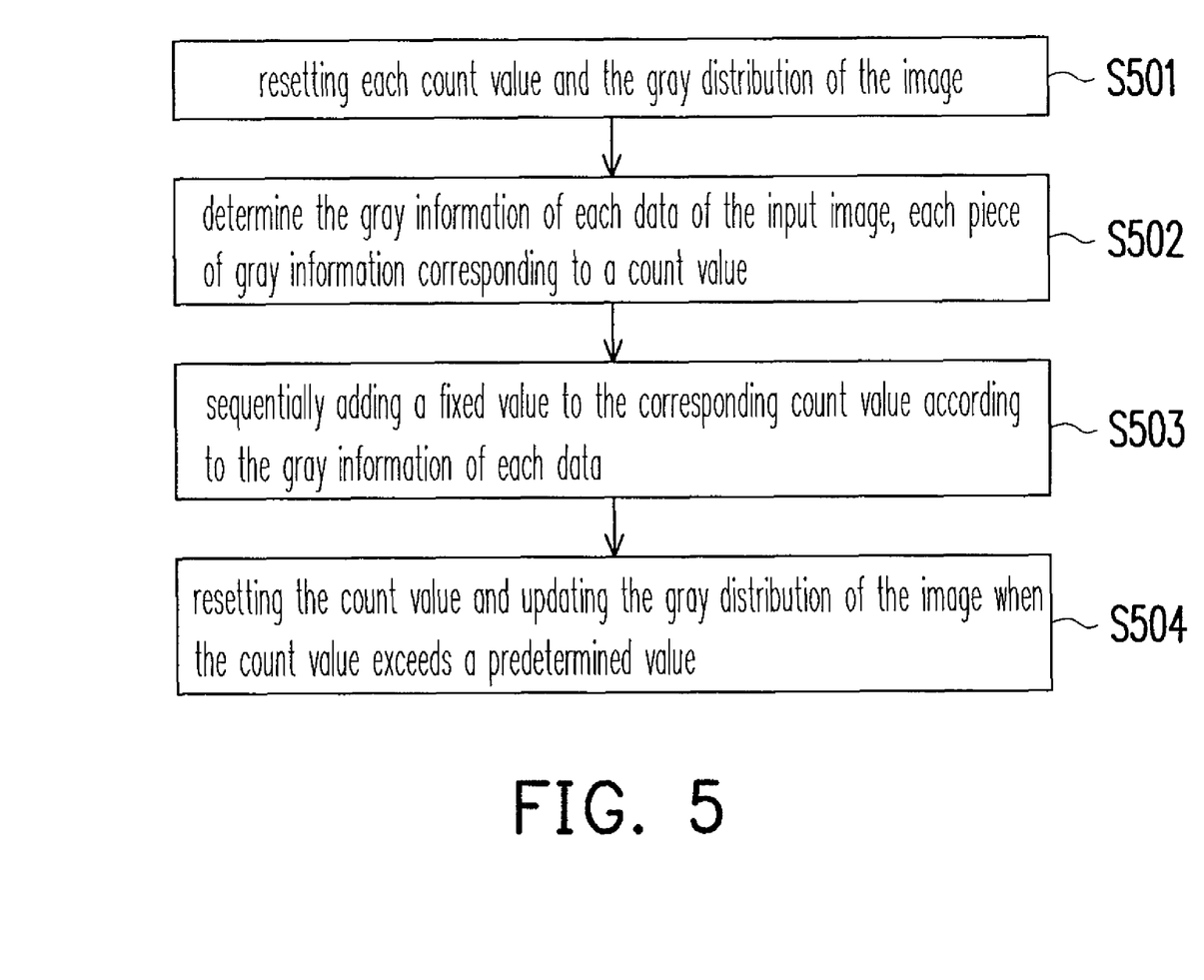
FIG. 5 is a flow chart of a method of gathering statistics of gray distribution of an image according to the first embodiment of the present invention.

FIG. 5 is a flow chart of a method of gathering statistics of gray distribution of an image according to the first embodiment of the present invention. Referring to both FIG. 3 and FIG. 5, take a monochrome image having 256 gray levels and a resolution of 1366×768 as an example again. First, at step S501, before gathering statistics of gray distribution of each input image, a clearing signal clear_2 may be used to reset the count values of the counters 30.0~30.255 to reset all the count values to be 0. In addition, the clearing signal clear_2 may be transmitted to the control unit 70 to reset the gray distribution of the image in the memory unit 50 so that the gray statistics of gray distribution of the image are all reset to be 0. In the present embodiment, the clearing signal clear_2 may be implemented with a frame signal, for example.

Next, at step S502, the comparing unit 20 determines the input gray information of each data of the input image. Furthermore, the counters 30.0~30.255 update the count values stored therein according to the input gray information of step S502 so as to count the amount of data corresponding to each piece of gray information (step S503). Suppose the gray values of the first five data data_1~data_5 of the input image are respectively "30," "25," "30," "30," and "30." When the data data_1 is output to the comparators 20.0~20.255, only the comparator 20.30 will output a high level voltage count signal CS and the comparators 20.0~20.29 and 20.31~20.255 will output low level voltage count signals CS. Therefore, the counter 30.30 will add a fixed value (1 as an example in the present embodiment) to the count value stored therein to change the count value in the counter 30.30 from 0 to 1.

Similarly, when the data data_2 (of gray value "25") is output to the comparators 20.0~20.255, the count value of the counter 30.25 will be changed from 0 to 1. When the data data_3 (of gray value "30") is output to the comparators 20.0~20.255, the count value of the counter 30.30 will be changed from 1 to 2. When the data data_4 (of gray value "30") is output to the comparators 20.0~20.255, the count value of the counter 30.30 will be changed from 2 to 3.

It should be noted that when the count value of one of the counters 30.0~30.255 reaches a predetermined value, the count value of the corresponding counter may be reset and the gray distribution of the image may be updated (step S504). In the present embodiment, the predetermined value is 3 for the purpose of illustration, which is not limited by the present invention and persons skilled in the art may define other values based on requirements in other embodiments. Furthermore, the counters 30.0~30.255 respectively include two registers and thus may only count from 0 to 3. Continuing with the above description, when the data data_5 (of gray value "30") is input to the comparators 20.0~20.255, the counter 30.30 will add 1 to the count value. The count value of the counter 30.30 changes from 3 to 0 and the counter 30.30 generates the overflow signal FS to the pulse generator 31.30.

The pulse generator 31.30 then generates the pulse signal PS to the distributor 44. The predetermined gray information corresponding to the pulse signal PS generated by the pulse generator 31.30 is "30" so the distributor 44 outputs the read signal RS and the fixed address information ADIF corresponding to the gray information "30" to the control unit 70 according to the pulse signal PS. The control unit 70 then controls the memory unit 50 to output the gray statistics corresponding to the gray information "30" to the feedback circuit 80 according to the read signal RS and the fixed address information ADIF. Next, the feedback circuit 80 adds 1 to the gray statistics corresponding to the gray information "30" so that the gray statistics corresponding to the gray information "30" changes from 0 to 1. The feedback circuit 80 then sends the gray statistics corresponding to the gray information "30" (i.e. 1) back to the control unit 70.

In another aspect, the delayer 60 delays the read signal RS by the clock signal clk_5 of a clock cycle so as to generate the write signal WS to the control unit 70. The control unit 70 then may write the gray statistics corresponding to the gray information "30" (i.e. 1) into the memory unit 50 according to the write signal WS and the fixed address information ADIF. Accordingly, the step of updating the gray distribution of the image in the memory unit 50 is completed. Similarly, the count unit 30 may be continuingly used to count the amount of data of each piece of gray information. When the count value exceeds 3, the control unit 70 is used to update the gray distribution of the image stored in the memory unit 50. In the present embodiment, each time when the gray statistics of the gray distribution of the image is increased by 1, it means that the amount of data of the corresponding gray information is increased by 4.

It should be mentioned that the fixed value added by the abovementioned adder 90 is 1 for the purpose of illustration. However, persons skilled in the art may change the fixed value added by the adder 90 to be other values based on requirements. For example, the fixed value added by the adder 90 may be changed to 4. Then, the gray statistics of the gray distribution of the image represents the amount of data of the gray information.

Referring to FIG. 2A again, in the above embodiment, the analysis of the gray distribution of the input image takes a period of time, resulting in that the input image and the gray distribution of the input image can not be displayed synchronously. Because of the minor differences among images that are continuous, the gray distribution of an image has a significant reference value for the next image. Therefore, persons skilled in the art may display the gray distribution of an image together with the next image so as to improve the problem that the input image and the gray distribution of the input image can not be displayed synchronously.

In summary, the present embodiment uses the count unit 30 to count the amount of data of each piece of gray information. When the amount of data exceeds a predetermined value, the gray distribution of an image is then updated. Therefore, it is not required to update the gray distribution of an image each time a data is received so the flow of process of gathering statistics of the gray distribution of an image is simplified in the present embodiment. In addition to the aforesaid, the counters 30.0~30.255 are 2 bit counters so each counter respectively requires 2 registers for implementation. In contrast, the conventional counters are 21 bit counters so each counter requires 21 registers for implementation. Compared with conventional technology, the present embodiment reduces the number of registers and thus greatly decreases hardware costs.

It should be noted that a device of gathering statistics of gray distribution of an image and method thereof have been generally narrated in the above embodiment, whilst people skilled in the pertinent art should be aware that different manufacturers aim at designing distinctive devices of gathering statistics of gray distribution of an image and methods thereof. Hence, the application of the present invention should not be limited to the embodiment provided hereinbefore. In other words, any device of gathering statistics of gray distribution of an image and method thereof that accumulates count values of gray information and updates the gray distribution of an image when the accumulated values exceed a predetermined value falls within the spirit of the present invention. Another embodiment is further discussed hereinafter to allow persons skilled in the art to further comprehend and implement the present invention.

The Second Embodiment

Figure 6:
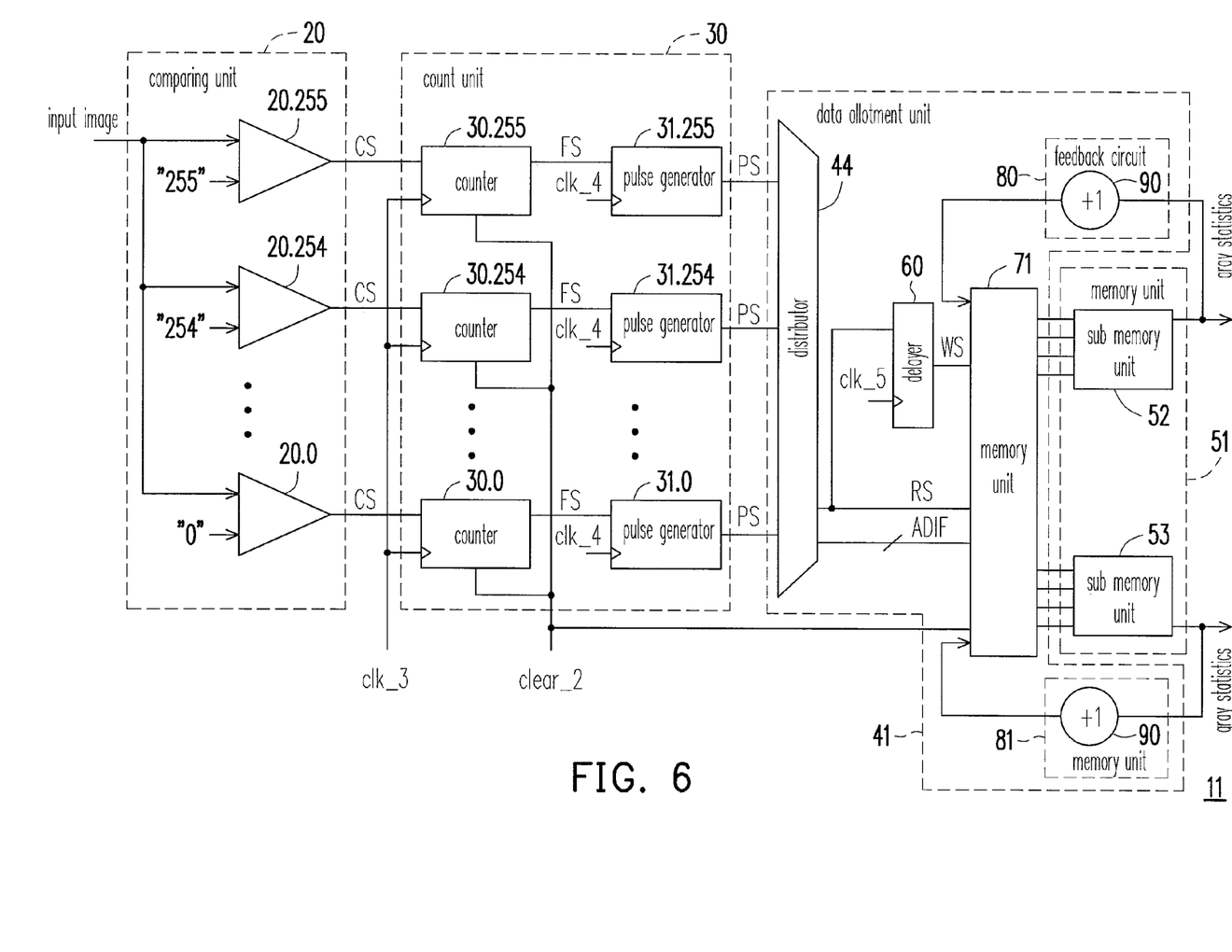
FIG. 6 is a schematic diagram of a device of gathering statistics of gray distribution of an image according to a second embodiment of the present invention.

FIG. 6 is a schematic diagram of a device of gathering statistics of gray distribution of an image according to the second embodiment of the present invention. Referring to both FIG. 3 and FIG. 6, the device 11 of gathering statistics of gray distribution of an image in FIG. 6 is similar to the device 10 of gathering statistics of gray distribution of an image in FIG. 3. In FIG. 6, implementation of components whose reference numerals are the same as the components in the above embodiment may be directed to the above description. It should be noted that a memory unit 51 of the present embodiment includes sub memory units 52 and 53. In addition, a data allotment unit 41 further includes a feedback circuit 81. When gathering statistics of the gray distribution of a first input image, a control unit 71 may reset the gray distribution of the image in the sub memory unit 52. Next, the control unit 71 may store the gray distribution of the first input image in the sub memory unit 52 and uses a feedback circuit 80 to update the gray distribution of the image stored in the sub memory unit 52.

When gathering statistics of the gray distribution of a second input image, the control unit 71 may reset the gray distribution of the image in the sub memory unit 53. Next, the control unit 71 may store the gray distribution of the second input image in the sub memory unit 53 and uses the feedback circuit 81 to update the gray distribution of the image stored in the sub memory unit 53. Therefore, when gathering the statistics of the gray distribution of the second input image, the gray distribution of the first input image is still stored in the sub memory unit 52 and is not lost. As such, the device 11 of gathering statistics of gray distribution of an image may simultaneously retain the gray distributions of two input images.

Compared with conventional technology, the present embodiment requires merely an additional sub memory unit to store an additional gray distribution of an image. On the other hand, the implementation of the count unit of the conventional technology requires twice of the number of registers to simultaneously retain the gray distributions of two input images. Therefore, the present embodiment achieves the same effects as the above embodiment and may simultaneously retain the gray distributions of two input images without tremendous hardware costs.

In summary, the present invention reduces the number of registers and thus decreases the hardware costs of the device of gathering statistics of gray distribution of an image by adopting the approach of updating the gray distribution of an image after the count value accumulating each piece of gray information exceeds a predetermined value. Moreover, the embodiments of the present invention have at least the following advantages:

1. The count unit is used to count the amount of data of each piece of gray information. When the amount of data exceeds a predetermined value, the gray distribution of an image is then updated. Therefore, it is not required to update the gray distribution of an image each time a data is received so the flow of process of gathering statistics of the gray distribution of an image is simplified.

2. The counters in the embodiments of the present invention are 2 bit counters so each counter respectively requires only 2 registers for implementation. In contrast, the conventional counters are 21 bit counters so each counter requires 21 registers for implementation. Compared with conventional technology, the embodiments of the present invention reduce the number of registers and thus greatly decrease hardware costs.

3. Compared with conventional technology, the embodiments of the present invention require merely an additional sub memory unit to store an additional gray distribution of an image. On the other hand, the implementation of the count unit of the conventional technology requires twice of the number of registers to simultaneously retain the gray distributions of two input images. Therefore, the present embodiment may simultaneously retain gray distributions of two input images without tremendous hardware costs.

It will be apparent to those skilled in the art that various modifications and variations can be made to the structure of the present invention without departing from the scope or spirit of the invention. In view of the foregoing, it is intended that the present invention cover modifications and variations of this invention provided that they fall within the scope of the following claims and their equivalents.

What is claimed is:

1. A device of gathering statistics of gray distribution of an image, comprising:

a comparing unit, used to determine gray information of a plurality of data of an image, wherein based on the gray information, the comparing unit outputs a corresponding count signal;

a count unit, coupled to the comparing unit and comprising a plurality of counters, wherein each of the plurality of counters respectively corresponds to predetermined gray information and has a count value, each of the plurality of counters updates the count value according to the corresponding count signal, and when the count value exceeds a predetermined value, the counter outputs a pulse signal corresponding to the gray information;

a memory unit, used to store a gray distribution of an image; and a data allotment unit, coupled to the count unit and the memory unit and updating the gray distribution of the image according to the pulse signal.

2. The device of gathering statistics of gray distribution of an image according to claim 1, wherein the comparing unit has a plurality of comparators, each of the comparators respectively receives the predetermined gray information corresponding to the counters, and each of the comparators is used to respectively compare the data of the input image with the predetermined gray information so as to determine the gray information of the data.

3. The device of gathering statistics of gray distribution of an image according to claim 1, the count unit further comprising:

a plurality of pulse generators, respectively coupled to each of the counters, wherein when one of the count values exceeds the predetermined value, the corresponding counter will output an overflow signal to the pulse generator to cause the pulse generator to output the pulse signal.

4. The device of gathering statistics of gray distribution of an image according to claim 3, the pulse generators respectively comprising:

a first D flip-flop, coupled to the counter, receiving the overflow signal, and outputting the overflow signal according to a first clock signal;

a second D flip-flop, wherein an input terminal of the second D flip-flop is coupled to an output terminal of the first D flip-flop and the second D flip-flop outputs the overflow signal according to the first clock signal;

a NOT gate, wherein an input terminal of the NOT gate is coupled to the output terminal of the first D flip-flop;

an AND gate, wherein a first input terminal and a second input terminal of the AND gate are respectively coupled to an output terminal of the second D flip-flop and an output terminal of the NOT gate to generate the pulse signal; and a third D flip-flop, coupled to an output terminal of the AND gate and outputting the pulse signal according to a second clock signal.

5. The device of gathering statistics of gray distribution of an image according to claim 1, the data allotment unit comprising:

a distributor, coupled to the count unit and providing fixed address information and a read signal according to the pulse signal;

a delayer, coupled to the distributor, and used to delay the read signal so as to generate a write signal;

a control unit, coupled to the distributor and the delayer and causing the memory unit to output a gray statistics of the gray distribution of the image according to the fixed address information and the read signal; and a feedback circuit, coupled to the memory unit and the control unit, and used to update the gray statistics and to send back the gray statistics to the control unit, wherein the control unit then writes the updated gray statistics into the memory unit according to the write signal.

6. The device of gathering statistics of gray distribution of an image according to claim 5, the feedback circuit comprising:

an adder, coupled to the memory unit and the control unit, and used to add a fixed value to the gray statistics output from the memory unit and to send the added value back to the control unit.

7. The device of gathering statistics of gray distribution of an image according to claim 1, the memory unit comprising:

a plurality of sub memory units, used to retain gray distributions of a plurality of input images.

8. The device of gathering statistics of gray distribution of an image according to claim 1, wherein the counters and the memory unit respectively have a receiving terminal for a clearing signal, when the each of the counters receives the clearing signal, the count value is reset, and when the memory unit receives the clearing signal, the gray distribution of the image is reset.

* * * * *